(12) United States Patent
Watanabe et al.

(10) Patent No.: US 8,678,341 B2
(45) Date of Patent: Mar. 25, 2014

(54) NORMALLY CLOSED SOLENOID VALVE

(75) Inventors: Shota Watanabe, Kariya (JP); Shin Sasaki, Okazaki (JP); Kazuyuki Kobayashi, Anjo (JP); Takahiro Miyagi, Kariya (JP)

(73) Assignee: Advics Co., Ltd., Kariya, Aichi (JP)

( * ) Notice: Subject to any disclaimer, the term of this patent is extended or adjusted under 35 U.S.C. 154(b) by 0 days.

(21) Appl. No.: 13/638,515

(22) PCT Filed: Jun. 10, 2011

(86) PCT No.: PCT/JP2011/063384
§ 371 (c)(1),
(2), (4) Date: Sep. 28, 2012

(87) PCT Pub. No.: WO2011/155603
PCT Pub. Date: Dec. 15, 2011

(65) Prior Publication Data
US 2013/0020514 A1    Jan. 24, 2013

(30) Foreign Application Priority Data

Jun. 10, 2010 (JP) .................................. 2010-132599

(51) Int. Cl.
*F16K 31/12* (2006.01)
*F16K 31/02* (2006.01)

(52) U.S. Cl.
USPC ........................................ 251/50; 251/129.15

(58) Field of Classification Search
USPC ........................................ 251/48, 50, 129.15
See application file for complete search history.

(56) References Cited

U.S. PATENT DOCUMENTS

| 2005/0001183 A1 | 1/2005 | Hironaka |
| 2007/0181840 A1* | 8/2007 | Mitsumata et al. ...... 251/129.15 |
| 2010/0019180 A1* | 1/2010 | Voss .......................... 251/129.15 |

FOREIGN PATENT DOCUMENTS

| JP | 59-175768 U | 11/1984 |
| JP | 08-075026 A | 3/1996 |
| JP | 2003-343754 A | 12/2003 |

(Continued)

OTHER PUBLICATIONS

International Search Report (PCT/ISA/210) issued on Jul. 5, 2011, by the Japanese Patent Office as the International Searching Authority for International Application No. PCT/JP2011/063384.

(Continued)

*Primary Examiner* — John K Fristoe, Jr.
*Assistant Examiner* — Michael R Reid
(74) *Attorney, Agent, or Firm* — Buchanan Ingersoll & Rooney PC

(57) ABSTRACT

To minimize the amount of air that may enter the damper chamber in a normally closed solenoid valve to stably maintain the damper capacity, the normally closed solenoid valve has a valve housing and a movable element. A cylinder having an open end is formed in one of the valve housing and the movable element. The cylinder has an inner diameter smaller than the outer diameter of a trunk of the movable element. A piston provided on the other of the valve chamber and the movable element is movable relative to the cylinder as the movable member moves. The piston is inserted into the cylinder through its open end to define a damper chamber between the piston and the cylinder. A restricted passage is formed between the damper chamber and the valve chamber through which hydraulic fluid can be moved between the valve chamber and the damper chamber.

9 Claims, 8 Drawing Sheets

(56) References Cited

FOREIGN PATENT DOCUMENTS

| JP | 2005-024077 A | 1/2005 |
|----|---------------|--------|
| JP | 2007-040423 A | 2/2007 |
| JP | 2008-121721 A | 5/2008 |
| JP | 2008-164068 A | 7/2008 |

OTHER PUBLICATIONS

Written Opinion (PCT/ISA/237) issued on Jul. 5, 2011, by the Japanese Patent Office as the International Searching Authority for International Application No. PCT/JP2011/063384.

* cited by examiner

NORMALLY CLOSED SOLENOID VALVE

TECHNICAL FIELD

This invention relates to a normally closed solenoid valve mounted in hydraulic circuits such as vehicle brake hydraulic pressure control systems. More specifically, the invention is directed to a solenoid valve including damper chamber which can more effectively suppress or damp vibration of a movable member of the solenoid valve.

BACKGROUND ART

The below-identified Patent document 1 discloses a conventional solenoid valve of the above-described type. This solenoid valve includes a movable element (plunger) mounted in a body and to which the force of a spring is applied in the valve closing direction and a magnetic attraction force generated by energizing a coil is applied in the valve opening direction, to drive a valve body. An elastic member is disposed around the movable element to partition the interior of the body into a valve chamber and a damper chamber.

The volume of the damper chamber is variable with the movement of the movable element. A restricted passage is defined by the elastic member through which the damper chamber and the valve chamber communicate with each other. The restricted passage limits the flow of hydraulic fluid between the valve chamber and the damper chamber when the volume of the damper chamber increases or decreases, thereby damping vibration of the movable element, which in turn reduces noise of the solenoid valve during operation.

PRIOR ART DOCUMENTS

Patent Documents

Patent document 1: JP Patent Publication 2008-121721A

SUMMARY OF THE INVENTION

Object of the Invention

The damper chamber of the solenoid valve disclosed in Patent document 1 is made up of a gap defined around the movable element, communication holes formed through the movable elements, a space defined between an end surface of the movable element which is opposite to its end on which the valve body is mounted and a fixed core of the solenoid valve so as to allow movement of the movable element, and a spring mounting chamber connected to the above space.

The volume of such a damper chamber changes to a considerable degree with the movement of the movable element, which inevitably necessitates an enlarged restricted passage between the damper chamber and the valve chamber.

Solenoid valves in vehicle brake hydraulic pressure control systems are ordinarily used with their axes extending horizontally, so that the larger the restricted passage, the more likely air in the valve chamber is to enter the damper chamber through the restricted passage. Since hydraulic fluid can less freely circulate through the damper chamber than through the valve chamber, once air enters the damper chamber, the air is scarcely discharged from the damper chamber and tends to remain in the damper chamber. Since air is lower in reaction to compression than hydraulic fluid, the damper capacity of the damper chamber tends to be lower if the damper chamber contains air than when the damper chamber contains no air. Thus it is desired to more positively prevent entry of air into the damper chamber.

An object of the present invention is, in a normally closed solenoid valve having a damper chamber for reducing vibration of a movable element of the solenoid valve, to minimize the amount of air that may enter the damper chamber, thereby stably maintaining the damper capacity of the damper chamber.

Means to Achieve the Object

In order to achieve this object, the present invention provides the following improvements over a conventional normally closed solenoid valve comprising a valve housing defining a valve chamber and having a seating surface, a valve body configured to be moved into and out of contact with the seating surface, thereby closing and opening the valve, a movable element at least partially made of a magnetic material and mounted in the valve chamber of the valve housing so as to support the valve body, a spring biasing the movable element in a valve closing direction, and a solenoid for applying a magnetic attraction force to a movable element attracting portion of the valve housing, thereby moving the movable element in a valve opening direction.

Specifically, one of the valve housing and the movable element is formed with a cylinder having a diameter smaller than an outer diameter of a trunk of the movable element and having an open end, and the other of the valve housing and the movable element is provided with a piston configured to be moved relative to the cylinder when the movable element moves. The piston is inserted in the cylinder through the open end of the cylinder, thereby defining a damper chamber between the piston and the cylinder of which the volume is variable when the piston and the cylinder move relative to each other. A restricted passage is defined between the damper chamber and the valve chamber through which hydraulic fluid can be introduced into the damper chamber from the valve chamber or discharged from the damper chamber into the valve chamber.

If the cylinder is formed in the valve housing, the piston is provided so as to be moved together with the movable element. If the cylinder is formed in the movable element, the piston is fixed in position.

The following are some preferred forms of the solenoid valve according to the present invention:
1) The restricted passage comprises a gap between a radially outer surface of the piston and a radially inner surface of the cylinder. With the piston arranged concentric with the movable element, this gap has a radial dimension smaller than a radial dimension of a gap defined between a radially outer surface of the trunk of the movable element and a radially inner surface of the valve chamber.
2) The spring is mounted in the damper chamber with its first end kept in abutment with the piston and its second end kept in abutment with a deep end surface of the cylinder.
3) The open end of the cylinder opens to the end surface of the movable element remote from its side on which the valve body is supported, the movable element having a center of gravity located farther from the valve supporting side of the movable element than is the deep end surface of the cylinder.
4) The length of the piston is determined such that with the solenoid valve not activated, the axial distance (L) between the piston and the deep end surface of the cylinder is shorter than the axial distance (L1) between the movable element and the end surface of the valve chamber to which the movable element is configured to be attracted.

5) The piston is a separate member from the valve housing and the movable element, and is pressed against one of the valve housing and the movable element under the force of the spring.

6) The piston is integral with one of the valve housing and the movable element, and the piston and the cylinder constitutes a movement guide for guiding the movement of one end portion of the movable element.

7) The movable element includes a shaft portion having a diameter smaller than the outer diameter of the trunk and having a portion supporting the valve body, and the solenoid valve further comprises a slide guide disposed between the radially inner surface of the valve chamber and the shaft portion, the shaft portion and the slide guide constituting a movement guide for guiding the movement of the side of the movable element supporting the valve body.

8) The shaft portion of the movable element is a separate member from the trunk and is kept in abutment with the axial end surface of the trunk on the side of the movable element on which the valve body is supported.

9) The solenoid valve further comprises a non-magnetic sleeve fitted around the trunk of the movable element.

The restricted passage may comprise a small hole formed in the piston through which the valve chamber communicates with the damper chamber.

Advantages of the Invention

According to the present invention, the damper for damping vibration of the movable element is formed by a cylinder formed in one of the valve housing and the movable member and a piston provided on the other of the valve housing and the movable member, and the cylinder has an inner diameter smaller than the outer diameter of the truck of the movable element. Thus, compared to the conventional arrangement of Patent document 1, or another conventional arrangement in which the damper chamber is defined between a piston which also serves as the movable element and the valve housing, it is possible to reduce the amount of change in volume of the damper chamber as the movable member moves by a predetermined stroke.

This makes it possible to reduce the restricted passage compared to the above conventional arrangements, without deteriorating the damper function of the damper chamber. By reducing the restricted passage, it is possible to reduce the possibility of entry of air into the damper chamber. If the restricted passage is a gap between the radially outer surface of the piston and the radially inner surface of the cylinder, its size should be substantially equal to an ordinary gap formed around the piston in order to ensure smooth sliding movement of the piston.

This arrangement minimizes entry of air into the damper chamber, thus minimizing deterioration of the damper function of the damper chamber. That is, the damper chamber maintains the function of damping vibration of the movable element, and thus the function of minimizing noise during operation of the solenoid valve.

The functions and advantages of the above-described preferred forms are described in the following description of the preferred embodiments.

BEST MODE FOR EMBODYING THE INVENTION

Figure 1:
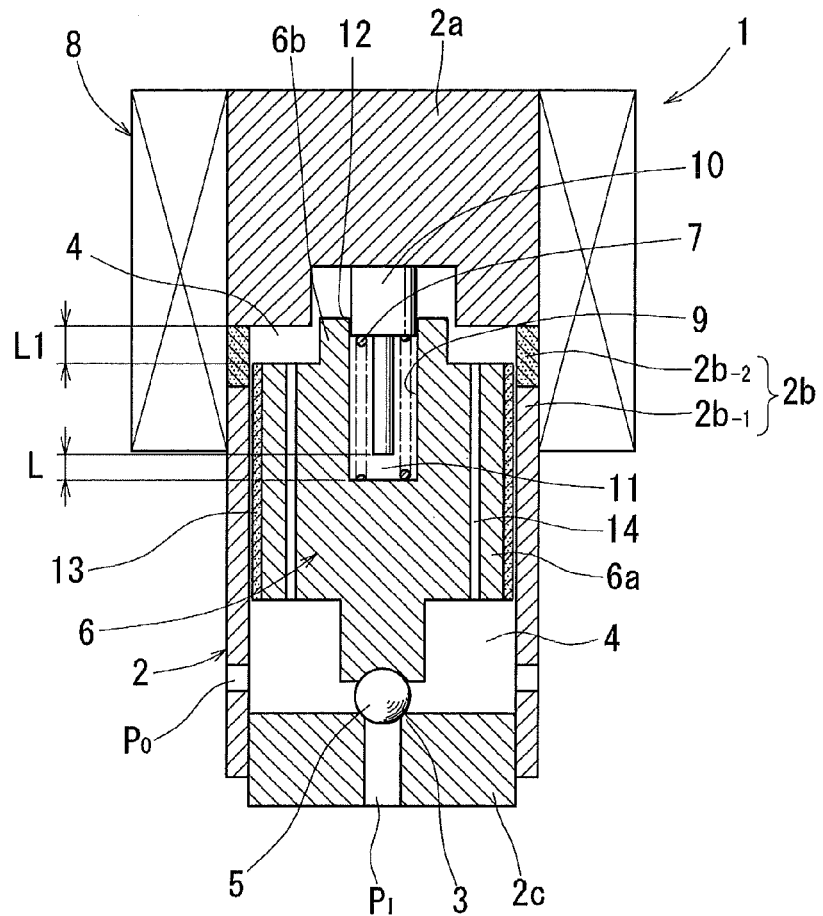
FIG. 1 is a schematic sectional view of a solenoid valve embodying the present invention.

Now the various solenoid valves embodying the present invention are described with reference to the drawings. First, the solenoid valve 1 shown in FIG. 1 includes a valve housing 2 having a seating surface 3 and defining a valve chamber 4, a valve body 5 mounted in the valve chamber 4 and configured to be moved into and out of contact with the valve seat 3, a movable element (also generally called a "movable core") 6 made of a magnetic material and mounted in the valve chamber 4, a spring 7 biasing the movable element 6 in a valve closing direction, and a solenoid 8.

The valve housing 2 comprises a fixed core 2a, a cylindrical member 2b defining the outer contour of the valve chamber 4, and a valve seat 2c closing the open end of the valve chamber 4. The seating surface 3 is formed on the valve seat 2c. The valve seat 2c is further formed with an inlet port $P_I$ communicating with the valve chamber 4. The cylindrical member 2b is formed with an outlet port $P_O$ also communicating with the valve chamber 4.

The solenoid 8 is conventional and typically includes a magnetic coil comprising a resin bobbin and a wire wound around the bobbin, and covered by a case. Since the solenoid 8 itself is a conventional one and is not an important feature of the present invention, it is only schematically shown in the drawings.

When the coil of the solenoid 8 is energized, a magnetic flux generated from the coil flows through the fixed core 2a of the valve housing 2, thus magnetizing the fixed core 2a. The magnetized fixed core 2a magnetically attracts the movable element 6 in the valve opening direction, so that the valve body 5, which is supported on the movable element 6, is moved together with movable element 6.

The movable element 6 is formed with a cylinder 9 which is open to the end surface of the movable element 6 axially opposite to its end surface on which the valve body 5 is supported. The movable element 6 has a trunk 6a which is larger in outer diameter than any other portion of the movable element 6. The cylinder 9, which includes the axis of the movable element 6, has a diameter smaller than the outer diameter of the trunk 6a of the movable element 6. The movable element 6 has a boss portion 6b on its end surface opposite to its end surface on which the valve body 5 is supported. The boss portion 6b has an outer diameter smaller than the outer diameter of the trunk 6a and larger than the diameter of the cylinder 9.

The end surface of the fixed core 2a to which the movable element 6 is attracted (i.e. its surface facing the valve chamber 4) is formed with a step corresponding to the shape of the boss portion 6b of the movable element 6. A piston 10 is mounted on the stepped end surface of the fixed core 2a at its center. The piston 10 is axially movable inserted into the cylinder 9 through the opening of the cylinder 9 to define a damper chamber 11 between the piston 10 and the cylinder 9 whose volume is variable as the piston and the cylinder move axially relative to each other (in the example shown, the volume of the chamber 11 is varied by the axial movement of the cylinder with the piston kept stationary).

A restricted passage 12 is defined between the valve chamber 4 and the damper chamber 11 through which hydraulic fluid in the valve chamber 4 is introduced into the damper chamber 11, and vice versa. The restricted passage 12 shown is a gap between the radially outer surface of the piston 10 and the radially inner surface of the cylinder 9. This gap has a radial dimension w (see FIG. 2) smaller than the radial dimension w1 of the radial gap between the radially outer surface of the trunk 6a of the movable element 6 and the radially inner surface of the valve chamber 4.

When the boss portion 6b is inserted into the small-diameter portion of the valve chamber 4, a gap is defined between the radially outer surface of the former and the radially inner surface of the latter of which the radial dimension is substantially equal to or larger than the above-mentioned radial dimension w1. With this arrangement, the restricted passage 12 restricts the flow rate of hydraulic fluid that flows into and out of the damper chamber 11, thus damping the movement of the movable element.

The spring 7, which biases the movable element 6, is received in the damper chamber 11 with a first end thereof in abutment with the deep end surface of the cylinder 9 of the movable element 6 and a second end thereof supported by the piston 10. With this arrangement, since the damper chamber 11 is also used as the installation space for the spring 7, it is possible to reduce the size of the solenoid valve. Further, in the arrangement of FIG. 1, since the cylinder 9, which defines the damper chamber 11 as the installation space for the spring 7, is formed in the movable element 6, it is possible to further reduce the size of the entire solenoid valve.

While the piston 10 of the solenoid valve 1 of FIG. 1 is a separate member from the fixed core 2a, it can be fixed to any necessary portion by pressing the piston 10 with the spring 7.

Preferably, the length of the piston 10 is determined such that distance L shown in FIG. 1 is smaller than distance L1, also shown in FIG. 1. Distance L is the axial distance between the piston 10 and the deep end surface of the cylinder 9. Distance L1 is the axial distance between the movable element 6 and the end face of the valve chamber to which the movable element is adapted to be magnetically attracted (i.e. the end face of the fixed core 2a facing the valve chamber). With this arrangement, the piston 10 serves as a stopper to prevent the movable element 6 from being attracted into contact with the fixed core 2a.

The piston 10 has a stepped structure comprising a large-diameter portion which supports the spring 7 at its end surface, and a small-diameter portion which is, as a stopper, adapted to move the distance L until its tip abuts the deep end surface of the cylinder 9. But the piston 10 may not have such a stepped structure.

With the solenoid valve 1 of FIG. 1, the cylindrical member 2b of the valve housing 2 comprises a sleeve $2b_{-1}$ made of a magnetic material, and a sleeve $2b_{-2}$ made of a non-magnetic material and disposed between and fixed to the fixed core 2a and the sleeve $2b_{-1}$. With this arrangement, the sleeve $2b_{-2}$ reduces the possibility of the sleeve $2b_{-1}$ being magnetized.

A non-magnetic sleeve 13 is fitted around the trunk 6a of the movable element 6 to reduce the force to attract the movable element 6 to the cylindrical member 2b to substantially zero. The sleeve 13 thus stabilizes the movement of the movable element 6. But the entire valve housing 2 may be made of a magnetic material, and also, the non-magnetic sleeve 13 may be omitted.

As shown in FIG. 1, communication holes 14 are formed axially through the trunk 6a of the movable element 6. Hydraulic fluid flowing into or out of the damper chamber 11 can pass not only through the gap between the radially outer surface of the truck 6a of the movable element 6 and the radially inner surface of the valve chamber 4, but also through the communication holes 14. The communication holes 14 thus make it possible to reduce the size of the gap between the trunk 6a and the valve chamber 4, which in turn makes it possible to more stably guide the movement of the movable element 6 with the radially inner surface of the valve chamber 4. The communication holes 14 are however not an indispensable element of the present invention, either.

Figure 2:
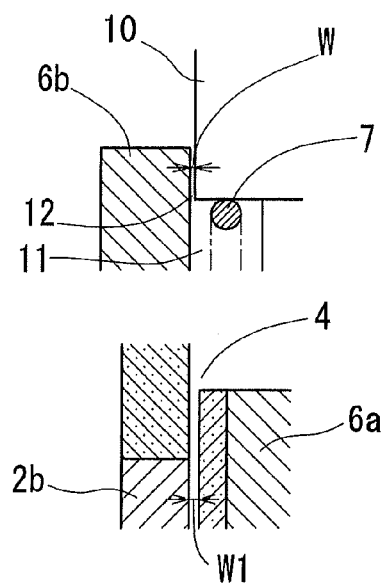
FIG. 2 show two enlarged sectional views of the solenoid valve, one showing a gap as a restricted passage and the other showing a gap between the radially outer surface of a trunk of a movable element and the radially inner surface of a valve chamber.
Figure 3:
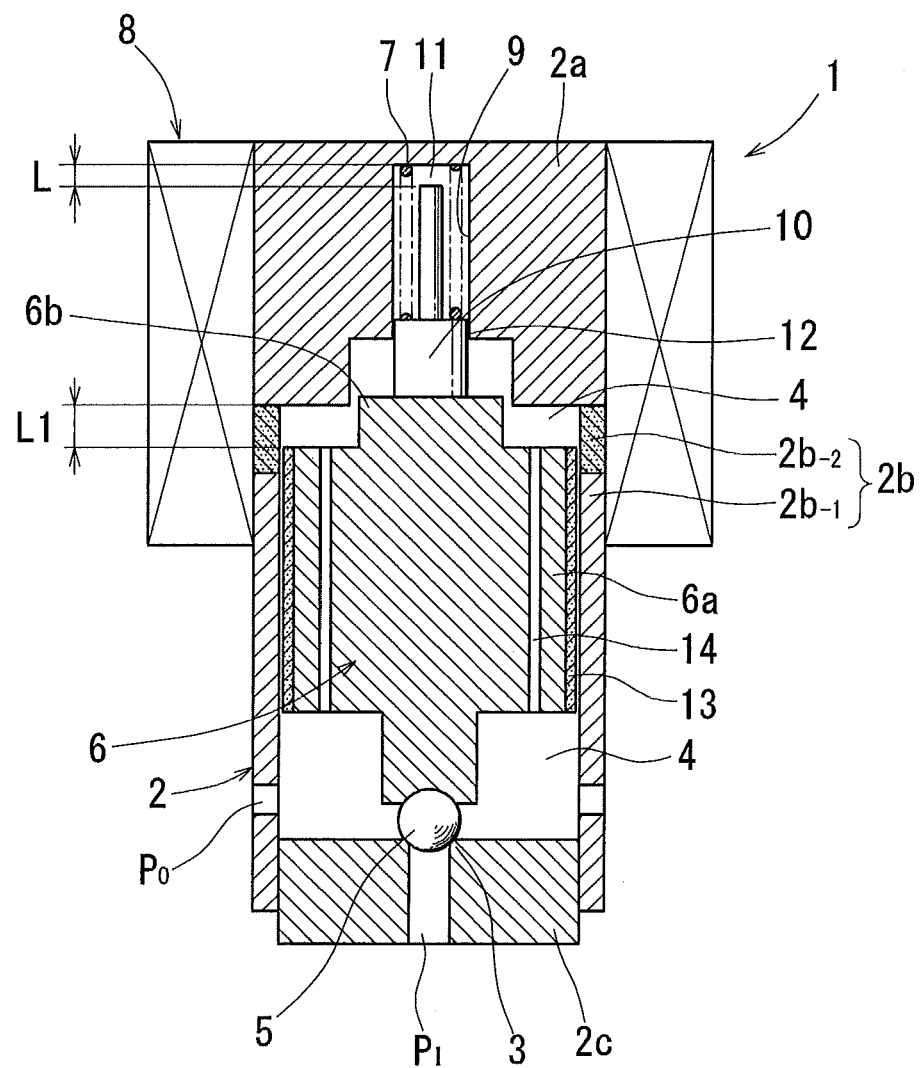
FIG. 3 is a schematic sectional view of another solenoid valve embodying the present invention.

FIG. 3 shows a different solenoid valve, in which the cylinder 9 is formed in the valve housing 2 (in the fixed core 2a in particular), instead of in the movable element 6 as in the embodiment of FIG. 1, and the piston 10 is mounted to the movable element 6, instead of to the fixed core 2a as in the embodiment of FIG. 1. In this arrangement too, a damper chamber 11 whose volume changes only slightly as with the damper chamber 11 of the embodiment of FIG. 1 is defined by the cylinder 9 and the piston 10. In this embodiment, the piston 10 is pressed against the movable element 6 by a spring 7 mounted in the damper chamber 11. Otherwise, the solenoid valve 1 of FIG. 2 is structurally identical to the solenoid valve of FIG. 1. Thus any further description thereof is omitted.

Since the pistons 10 of the solenoid valves 1 of FIGS. 1 and 3 are provided independently of the movable element 6 and the valve housing 2, respectively, either of the pistons 10 is never twisted in the cylinder 9 even if the movable element 6 is inclined. The piston can thus always move smoothly.

Figure 4:
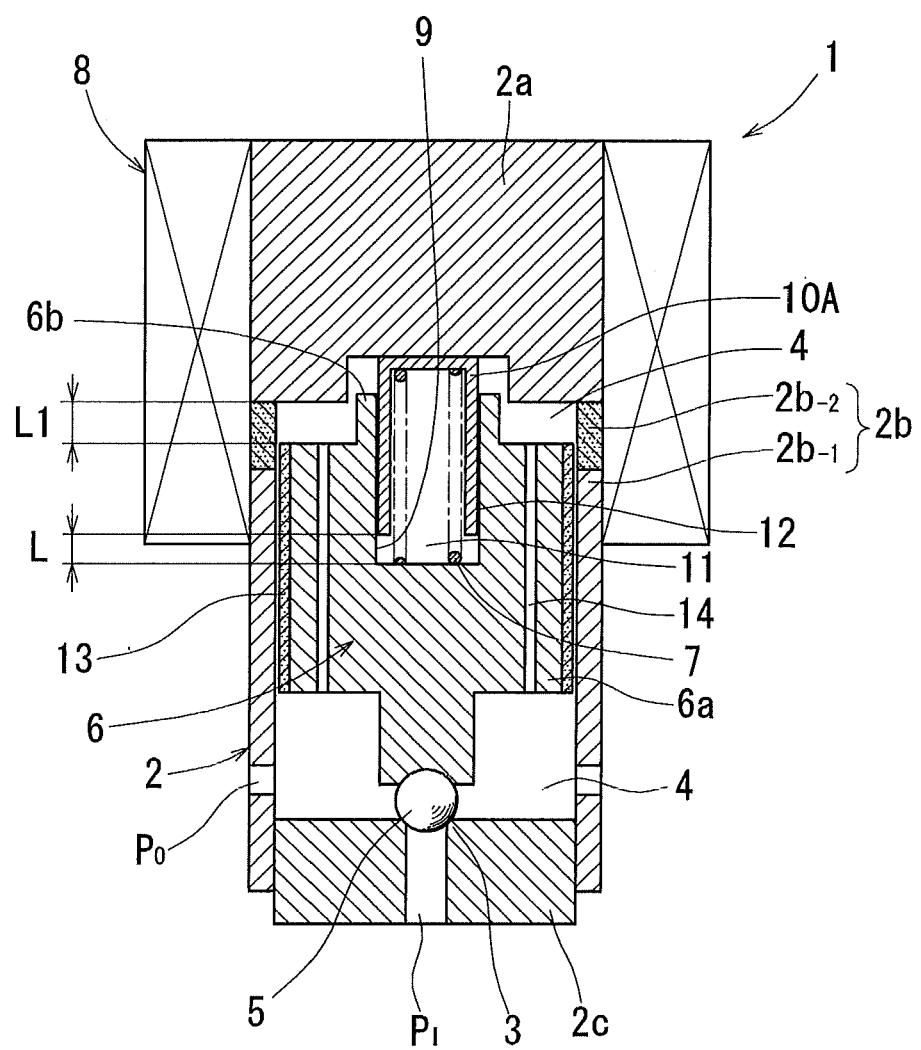
FIG. 4 is a schematic sectional view of a modified embodiment of the solenoid valve of FIG. 1.

FIG. 4 shows a modification of the solenoid valve of FIG. 1, in which instead of the solid piston 10 of FIG. 1, a bottomed tubular (i.e. cup-shaped) piston 10A is used. The open end portion of the piston 10A is inserted in the cylinder 9 to define the damper chamber 11 between the cylinder 9 and the piston 10A. The restricted passage 12 is defined between the damper chamber 11 and the valve chamber 4. The spring 7 is mounted in the damper chamber 11 with the second end portion thereof inserted into the piston 10A.

The restricted passage 12 shown is defined between the radially outer surface of the piston 10A and the radially inner surface of the cylinder 9. But instead, the restricted passage 12 may comprise a small hole (not shown) formed in the piston 10A through which the valve chamber 4 communicates with the damper chamber 11. The solenoid valve of FIG. 4 is otherwise structurally identical to the solenoid valve of FIG. 1.

Thus in this embodiment too, the length of the piston 10A is determined such that the axial distance L between the piston 10A and the deep end surface of the cylinder 9 is smaller than the axial distance L1 between the movable element 6 and the end face of the valve chamber 4 to which the movable element is adapted to be magnetically attracted, to prevent the movable element 6 from being attracted into contact with the fixed core 2a.

Figure 5:
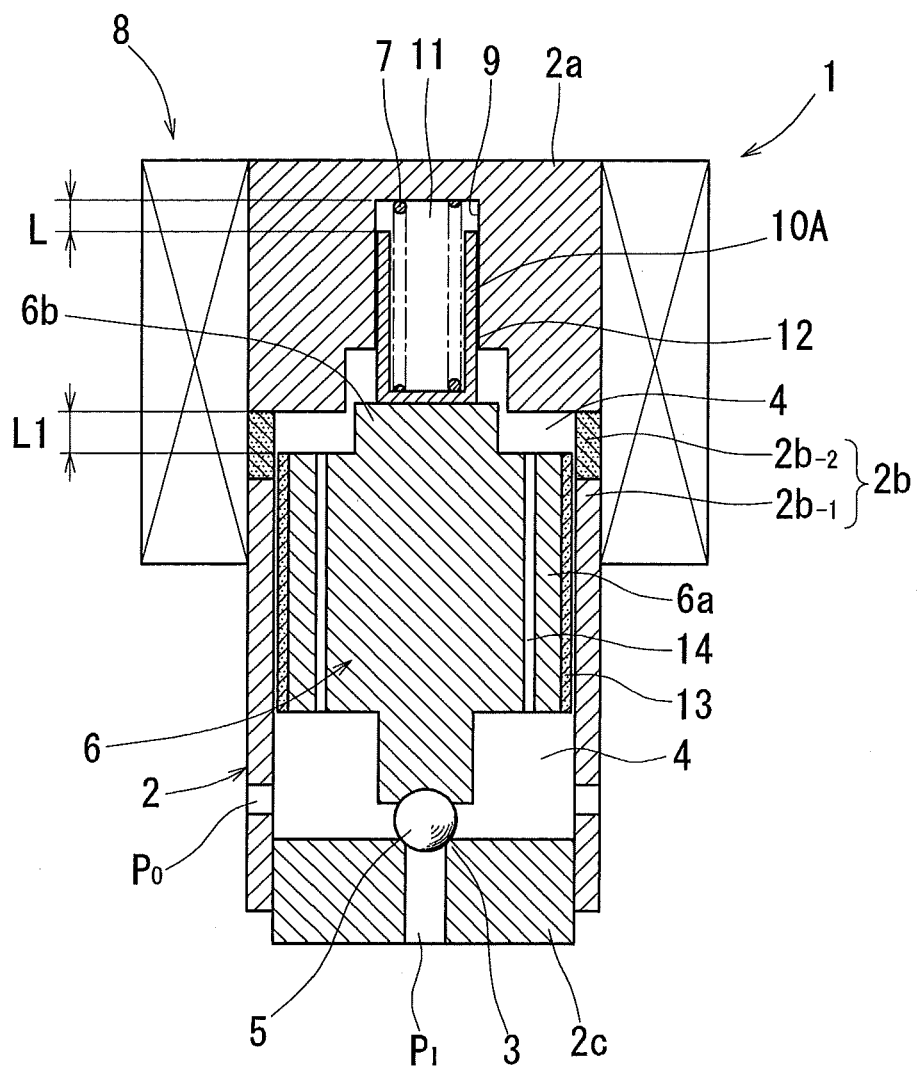
FIG. 5 is a schematic sectional view of a modified embodiment of the solenoid valve of FIG. 3.

The solenoid valve 1 of FIG. 5 is a modification of the solenoid valve of FIG. 3, in which instead of the solid piston of FIG. 3, the same bottomed tubular piston 10A shown in FIG. 4 is used. The piston 10A is inserted in the cylinder 9, which is formed in the fixed core 2a of the housing 2, to define the damper chamber 11. The piston 10A is pressed against the movable element 6 by the spring 7, which is mounted in the damper chamber 11.

With the solenoid valve 1 of FIG. 5 too, the restricted passage 12 is defined between the radially outer surface of the piston 10A and the radially inner surface of the cylinder 9. But instead, the restricted passage 12 may comprise the small hole formed in the piston 10A. Otherwise, this embodiment is structurally identical to the solenoid valve of FIG. 3.

Figure 6:
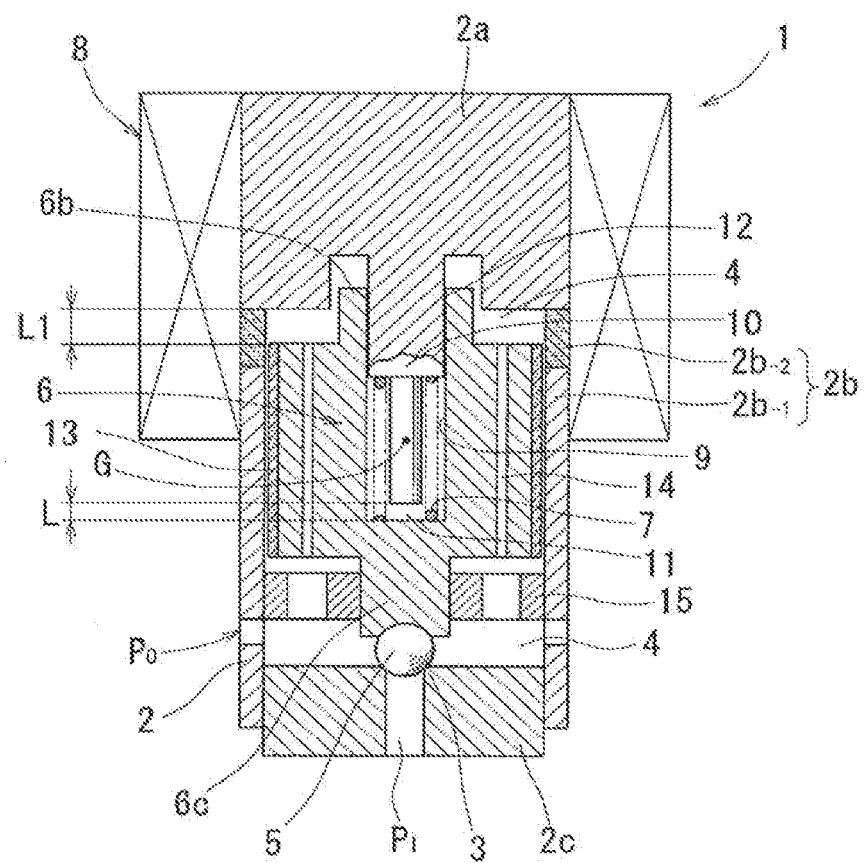
FIG. 6 is a schematic sectional view of another modified embodiment of the solenoid valve of FIG. 1.

The solenoid valve 1 of FIG. 6 is another modification of the solenoid valve of FIG. 1. As shown, the piston 10, which defines the damper chamber 11, is integral with the housing (or its fixed core 2a). The piston 10 and the cylinder 9 constitute a movement guide for guiding the movement the first end portion of the movable element 6 opposite to its second end on which the valve body 3 is supported.

The cylinder 9 is formed in the movable element 6 so as to open to the first end surface of the movable element 6 opposite to its second end surface on which the valve body 3 is supported, with its deep end surface located nearer to the second end surface of the movable element 6 than is the center of gravity G of the movable element 6. The spring 7 has its second end in abutment with the deep end surface of the cylinder 9. With this arrangement, since the force of the spring 7 acts on the movable element 6 at its point between the center of gravity G and the second end surface of the movable element 6, i.e. at its point forward of the center of gravity G with respect to the direction in which the movable element 6 is moved by the spring 7, the movable element 6 is less likely to be inclined by the spring 7. This ensures smooth and stable movement of the movable element 6.

The movable element 6 is formed with a small-diameter shaft portion 6c having a diameter smaller than the outer diameter of the trunk of the movable element, for supporting the valve body 3. A slide guide 15 is fitted between the shaft portion 6c and the radially inner surface of the valve chamber 4. The shaft portion 6c and the slide guide 15 constitute a movement guide for guiding the movement of the second end portion (the end portion on which the valve body is supported) of the movable element 6. The slide guide 15 is formed with holes as fluid passages for the shaft portion.

With this arrangement, the movable element 6 can be guided even without the trunk 6a. Thus, it is possible to leave a large gap between the radially outer surface of the trunk 6a and the radially inner surface of the valve chamber 4, thus improving the flow of hydraulic fluid (and reducing the influence of the viscosity of hydraulic fluid). This in turn improves responsiveness of the solenoid valve. Also, since no high dimensional accuracy is required for the radially outer surface of the trunk of the movable element, the movable element can be manufactured at a low cost.

In the embodiment of FIG. 6 too, the non-magnetic sleeve 13 is not an indispensable element. Rather, since the non-magnetic sleeve 13 is provided to more smoothly guide the radially outer surface of the trunk 6a with the radially inner periphery of the valve chamber 4, the non-magnetic sleeve 13 is less important in this embodiment than in the embodiments of FIGS. 1-5.

Figure 7:
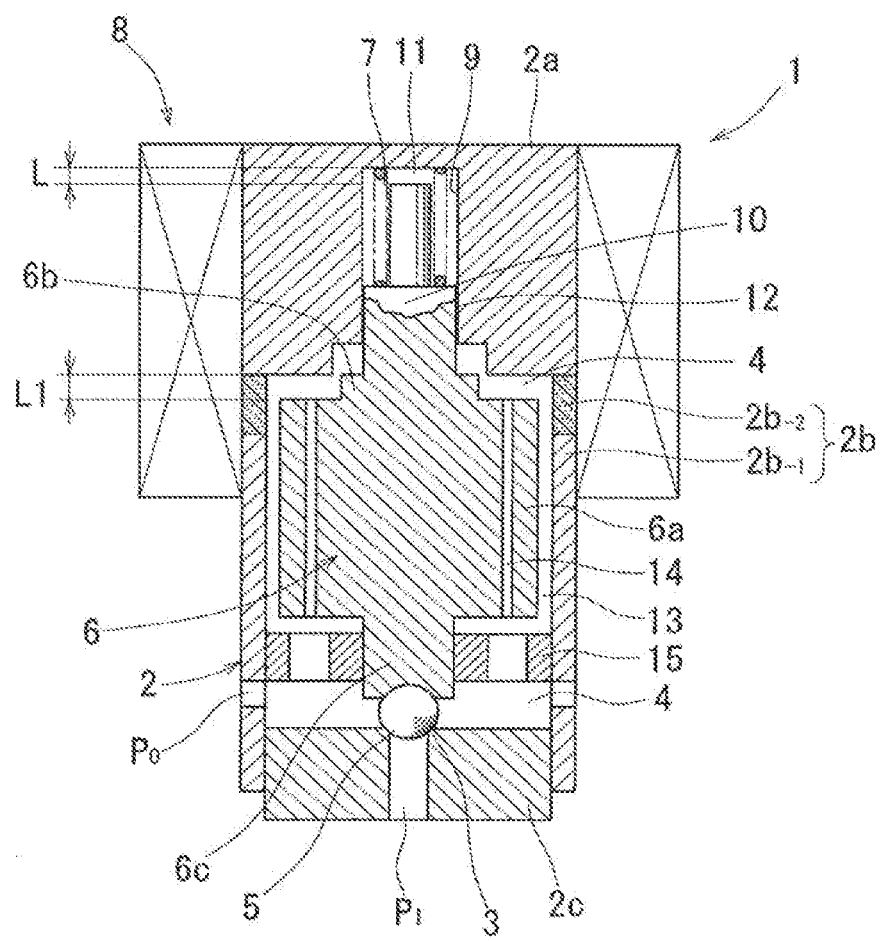
FIG. 7 is a schematic sectional view of another modified embodiment of the solenoid valve of FIG. 3.

The solenoid valve of FIG. 7 is another modification of the solenoid valve of FIG. 3. In this embodiment, the piston 10, which defines the damper chamber 11, is integral with the movable element 6. The piston 10 and the cylinder 9, which is formed in the valve housing, constitute a movement guide for guiding the movement of the first end portion of the movable element 6.

At the second end of the movable element 6, a second movement guide is provided which comprises the small-diameter shaft portion 6c, which is smaller in diameter than the outer diameter of the trunk 6a, and the slide guide 15 for the shaft portion. The two movement guides of this embodiment achieve the same advantages as those of the solenoid valve of FIG. 6 regarding e.g. responsiveness of the solenoid valve.

In the arrangement in which the movement guide comprising the small-diameter shaft portion 6c and the slide guide 15 for the shaft portion is provided at the second end of the movable element 6, as in the embodiments of FIGS. 6 and 7, if the movable element 6 is inclined due to slide clearance, the shaft portion 6c may be twisted in the slide guide 15 while being in sliding contact with the inner wall of the slide guide 15. This may produce unstable sliding resistance therebetween.

Figure 8:
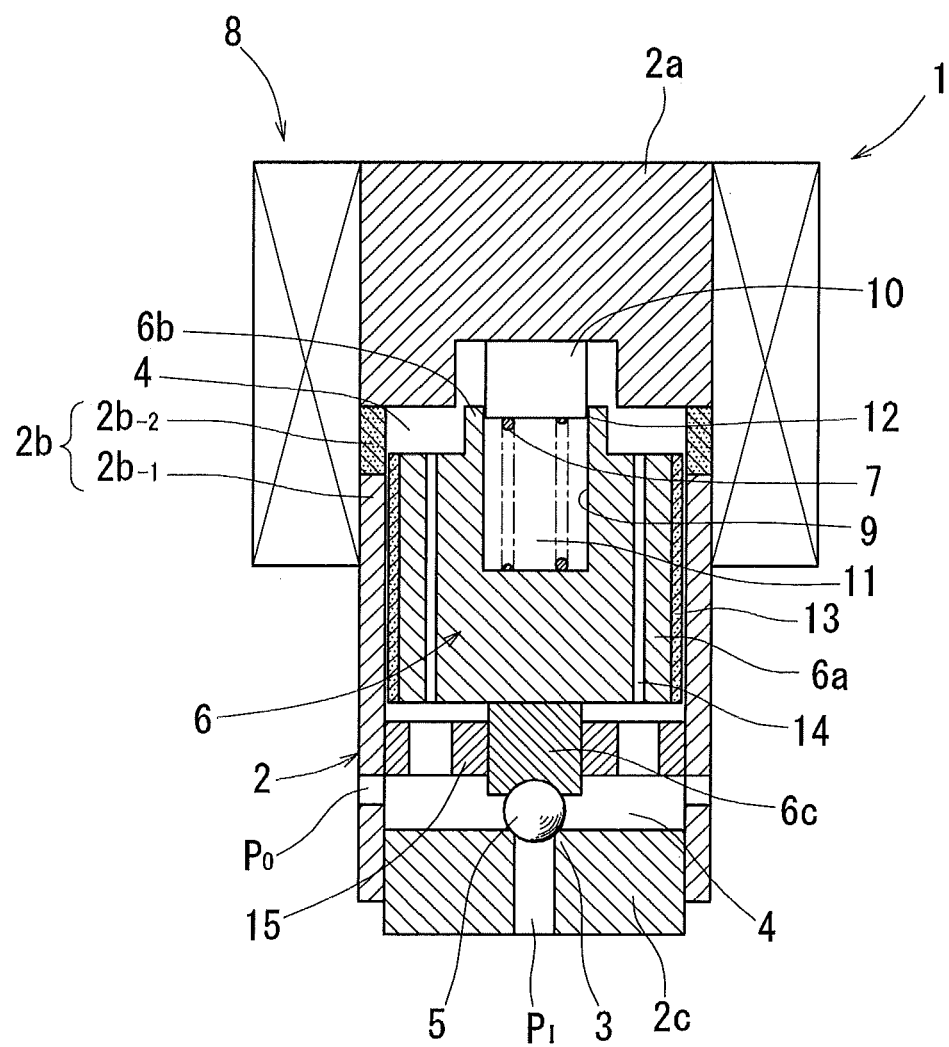
FIG. 8 is a schematic sectional view of still another modified embodiment of the solenoid valve of FIG. 1.
Figure 9:
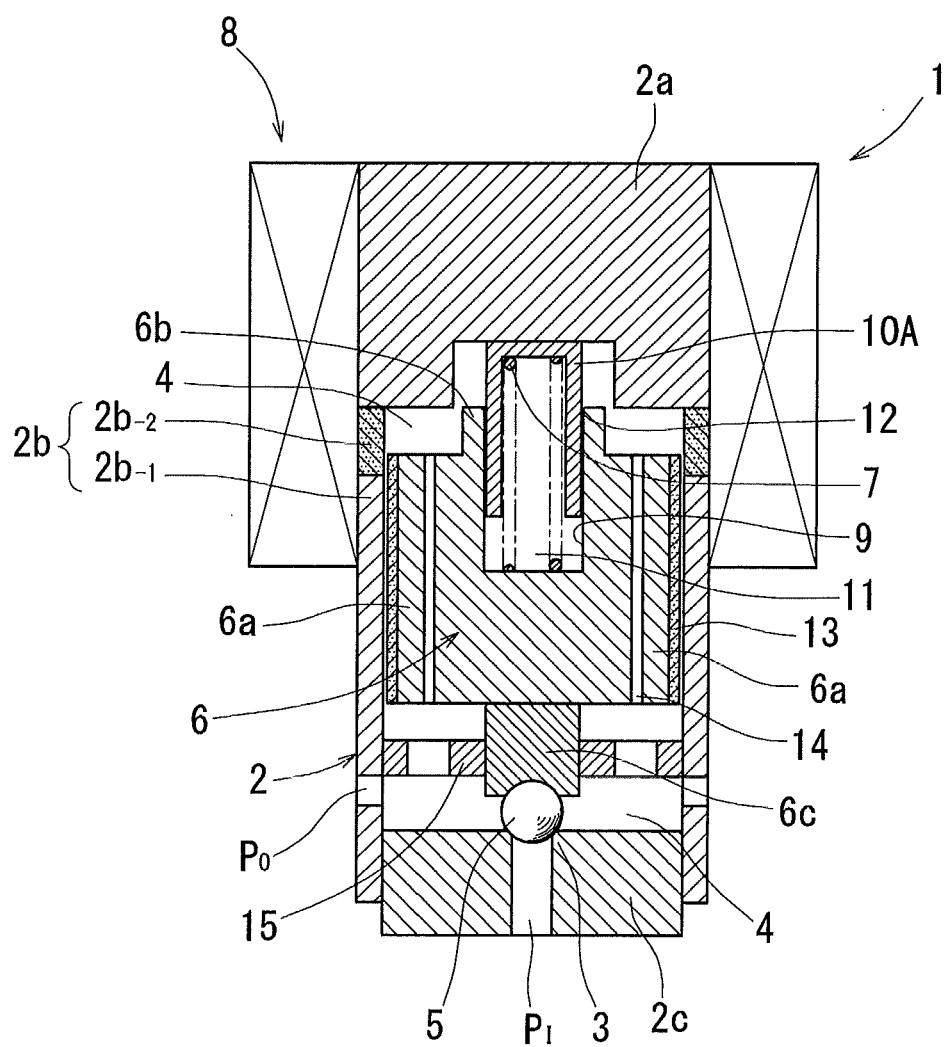
FIG. 9 is a schematic sectional view of a modified embodiment of the solenoid valve of FIG. 8, in which the piston of FIG. 8 is replaced by a cup-shaped piston.

FIGS. 8 and 9 show solenoid valves 1 including solutions to this problem. In particular, in either of the embodiments of FIGS. 8 and 9, the shaft portion 6c of the movable element 6 is a separate member from the trunk 6a, and is kept in abutment with an end surface of the trunk 6a facing the valve body and extending perpendicular to the axis of the movable element 6. With this arrangement, even if the trunk 6a of the movable element 6 is inclined, the shaft portion 6c remains uninclined. This prevents the shaft portion 6c from being twisted in the slide ring while being in sliding contact with the slide ring, which in turn ensures smooth movement of the valve body 5 and thus prevents pressure fluctuations of hydraulic fluid.

While the solenoid valve according to the present invention is open, hydraulic oil is introduced into the valve chamber 4 through the inlet port PI and pushes the movable element 6 in the valve opening direction through the valve body 5. While the solenoid valve is closed, the valve closing force from the spring 7 is transmitted to the shaft portion 6c through the trunk 6a. Thus, even if the shaft portion 6c is separate from the trunk 6a as in the embodiments of FIGS. 8 and 9, the solenoid valve operates without a problem.

The solenoid valve according to the present invention can be suitably used in vehicle brake hydraulic pressure control apparatus, but may be advantageously used in any other hydraulic apparatus or device to open and close its circuit in which it is desired to reduce vibration (pulsation).

DESCRIPTION OF THE NUMERALS

1. Solenoid valve
2. Valve housing
2a. Fixed core
2b. Cylindrical portion
2b-1. Magnetic sleeve
2b-2. Non-magnetic sleeve
2c. Valve seat
3. Seating surface
4. Valve chamber
5. Valve body
6. Movable element
6a. Trunk
6b. Boss portion
6c. Shaft portion
7. Spring
8. Solenoid
9. Cylinder
10, 10A. Piston 11. Damper chamber
12. Restricted passage
13. Non-magnetic sleeve
14. Communication hole
15. Slide guide
$P_I$. Inlet port
$P_O$. Outlet port
w. Radial dimension of a gap between the radially outer surface of the piston and the radially inner surface of the cylinder
w1. Radial dimension of the gap between the outer periphery of the trunk of the movable element and the radially inner surface of the valve chamber
L. Axial distance between the piston and the deep end surface of the cylinder
L1. Axial distance between the movable element and the end surface of the valve chamber to which the movable element is attracted
G. Center of gravity of the movable element

What is claimed is:

1. A normally closed solenoid valve comprising:
   a valve housing defining a valve chamber and having a seating surface;
   a valve body configured to be moved into and out of contact with the seating surface, thereby closing and opening the valve;
   a movable element at least partially made of a magnetic material and mounted in the valve chamber of the valve housing so as to support the valve body;
   a spring biasing the movable element in a valve closing direction;
   a solenoid for applying a magnetic attraction force to a movable element attracting portion of the valve housing, thereby moving the movable element in a valve opening direction;
   the movable element including a trunk possessing an outer diameter larger than any other portion of the movable element;
   one of the valve housing and the movable element being formed with a cylinder having a diameter smaller than the outer diameter of the trunk of the movable element and having an open end, and the other of the valve housing and the movable element being provided with a piston configured to be moved relative to the cylinder when the movable element moves;
   wherein the piston is inserted in the cylinder through the open end of the cylinder, thereby defining a damper chamber between the piston and the cylinder of which the volume is variable when the piston and the cylinder move relative to each other;
   wherein a restricted passage is defined between the damper chamber and the valve chamber through which hydraulic fluid is introduced into the damper chamber from the valve chamber or discharged from the damper chamber into the valve chamber; and
   wherein the restricted passage comprises a gap between a radially outer surface of the piston and a radially inner surface of the cylinder, and wherein said gap has a radial dimension smaller than a radial dimension of a gap defined between a maximum outer diameter portion of a radially outer surface of the trunk of the movable element and a radially inner surface of the valve chamber.

2. The normally closed solenoid valve of claim 1, wherein the spring is mounted in the damper chamber, the spring having a first end kept in abutment with the piston and a second end kept in abutment with a deep end surface of the cylinder.

3. The normally closed solenoid valve of claim 2, wherein the movable element has an end surface remote from a side of the movable element on which the valve body is supported, and wherein the open end of the cylinder opens to said end surface of the movable element, the movable element having a center of gravity located farther from said side of the movable element than is the deep end surface of the cylinder.

4. The normally closed solenoid valve of claim 1, wherein the piston possesses a length such that with the solenoid valve not activated, an axial distance between the piston and a deep end surface of the cylinder is shorter than an axial distance between the movable element and an end surface of the valve chamber to which the movable element is configured to be attracted.

5. A normally closed solenoid valve comprising:
   a valve housing defining a valve chamber and having a seating surface;
   a valve body configured to be moved into and out of contact with the seating surface, thereby closing and opening the valve;
   a movable element at least partially made of a magnetic material and mounted in the valve chamber of the valve housing so as to support the valve body;
   a spring biasing the movable element in a valve closing direction;
   a solenoid for applying a magnetic attraction force to a movable element attracting portion of the valve housing, thereby moving the movable element in a valve opening direction,
   the movable element including a trunk possessing an outer diameter larger than any other portion of the movable element;
   one of the valve housing and the movable element being formed with a cylinder having a diameter smaller than the outer diameter of the trunk of the movable element and having an open end, and the other of the valve housing and the movable element being provided with a piston configured to be moved relative to the cylinder when the movable element moves;
   the piston being inserted in the cylinder through the open end of the cylinder, thereby defining a damper chamber between the piston and the cylinder of which the volume is variable when the piston and the cylinder move relative to each other;
   a restricted passage defined between the damper chamber and the valve chamber through which hydraulic fluid is introduced into the damper chamber from the valve chamber or discharged from the damper chamber into the valve chamber;
   the restricted passage comprising a gap between a radially outer surface of the piston and a radially inner surface of the cylinder, said gap possessing a radial dimension smaller than a radial dimension of a gap defined between a radially outer surface of the trunk of the movable element and a radially inner surface of the valve chamber, the radially outer surface of the trunk of the movable element possessing an outer diameter greater than any other portion of the movable element; and
   wherein the piston is a separate member from the valve housing and the movable element, and is pressed against one of the valve housing and the movable element under the force of the spring.

6. The normally closed solenoid valve of claim 1, wherein the piston is integral with one of the valve housing and the movable element, and that the piston and the cylinder constitutes a movement guide for guiding the movement of one end portion of the movable element.

7. The normally closed solenoid valve of claim 1, wherein the movable element includes a shaft portion having a diameter smaller than the outer diameter of the trunk and having a portion supporting the valve body, and that the solenoid valve further comprises a slide guide disposed between a radially inner surface of the valve chamber and the shaft portion, the shaft portion and the slide guide constituting a movement guide for guiding the movement of the side of the movable element supporting the valve body.

8. The normally closed solenoid valve of claim 7, wherein the shaft portion of the movable element is a separate member from the trunk and is kept in abutment with an axial end surface of the trunk on the side of the movable element on which the valve body is supported.

9. The normally closed solenoid valve of claim 1, further comprising a non-magnetic sleeve fitted around the trunk of the movable element.

\* \* \* \* \*